United States Patent [19]
Greenwood

[11] 3,749,482
[45] July 31, 1973

[54] MOTION PICTURE FILM PROJECTOR
[75] Inventor: Donald Greenwood, Akron, Iowa
[73] Assignee: G-L-J Toy Co., Inc., New York, N.Y.
[22] Filed: Jan. 20, 1972
[21] Appl. No.: 219,408

[52] U.S. Cl. .............................................. 352/80
[51] Int. Cl. ........................................ G03b 21/32
[58] Field of Search .................... 352/80, 123, 136, 352/191, 221, 79, 226

[56] References Cited
UNITED STATES PATENTS
2,834,249 5/1958 May .............................. 352/80 UX
3,460,730 8/1969 Krumbein ........................ 352/80 X
3,514,196 5/1970 Roman ........................... 352/191 X

*Primary Examiner*—Samuel S. Matthews
*Assistant Examiner*—Michael L. Gellner
*Attorney*—Burton L. Lilling, Henry A. Marzullo, Jr. et al.

[57] ABSTRACT

A motion picture for projecting different sizes of film has an advancing claw laterally displaceable to line up with the perforations on the different width film strips. A film gate having different sized masking apertures is shiftable longitudinally. The film gate has two laterally spaced guide slots joined by a connecting slot. The film advancing claw is shifted between the guide slots by way of the connecting slot when the film gate is shifted to for accomidating the different sized films.

7 Claims, 6 Drawing Figures

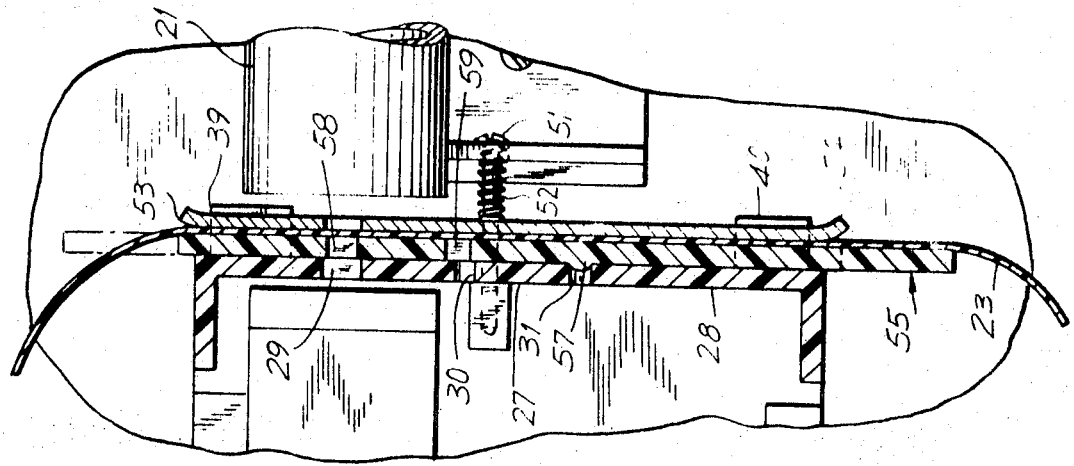
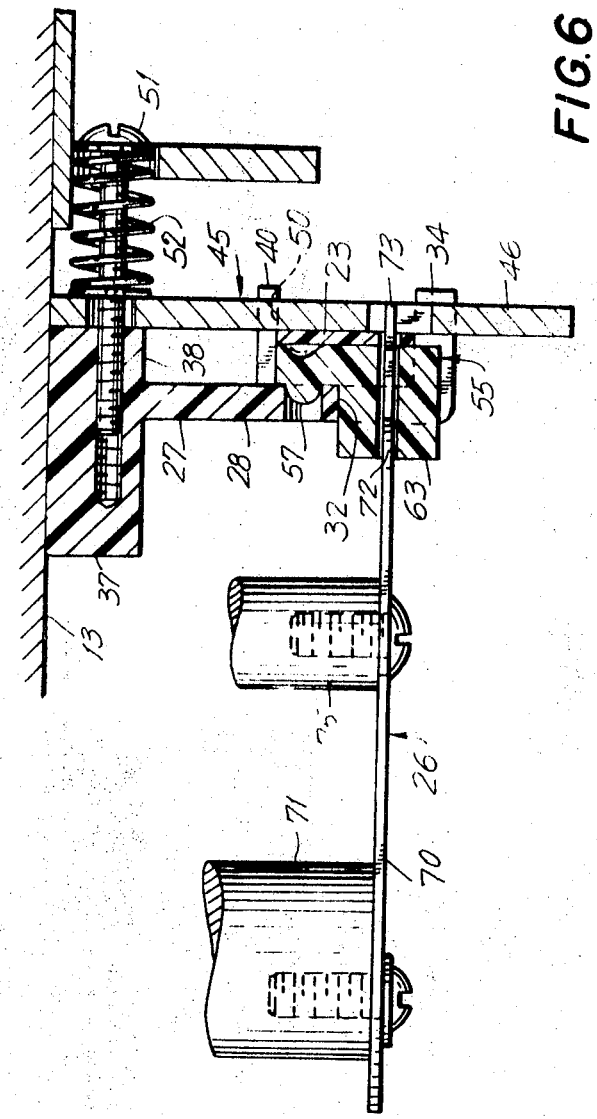
FIG.6
FIG.5

MOTION PICTURE FILM PROJECTOR

BACKGROUND OF THE INVENTION

As is well known to those versed in the art of motion picture film projection, there has become popular in recent years the so-called "Super 8" film format, which is an 8 millimeter film but has a 50 percent larger image area in each frame than the standard 8 millimeter motion picture format. Further, the perforations or sprocket holes for receiving a film driving or advancing member are considerably smaller in the Super 8 format than and offset laterally with respect to frame position from the location of the standard 8 millimeter film format.

While the commercial advantages of a projector capable of use with both standard 8 millimeter and Super 8 film format are obvious, and many constructions toward this end have been proposed, such devices have not found wide commerical acceptance by reason of their complexity in structure, difficulty in use, unreliability in operation and relatively high cost.

SUMMARY OF THE INVENTION

Accordingly, it is an important object of the present invention to provide a motion picture film projector adapted for use in conjunction with both standard 8 millimeter and Super 8 film formats, which is extremely simple in structure, capable of quick and easy conversion between film formats, entirely reliable throughout a long useful life, and is relatively inexpensive to manufacture and sell.

It is a further object of the present invention to provide a film projector having a unique adaptor structure for projection of either standard or Super 8 millimeter film, which is sufficiently staunch, durable, economical and reliable for use in relatively inexpensive toy products.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 5 is a partial horizontal sectional view taken generally along the line 5—5 of FIG. 4.

FIG. 6 is a partial sectional elevational view taken generally along the line 6—6 of FIG. 4.

DESCRIPTION OF THE PREFERRED EMBODIMENT

Figure 1:
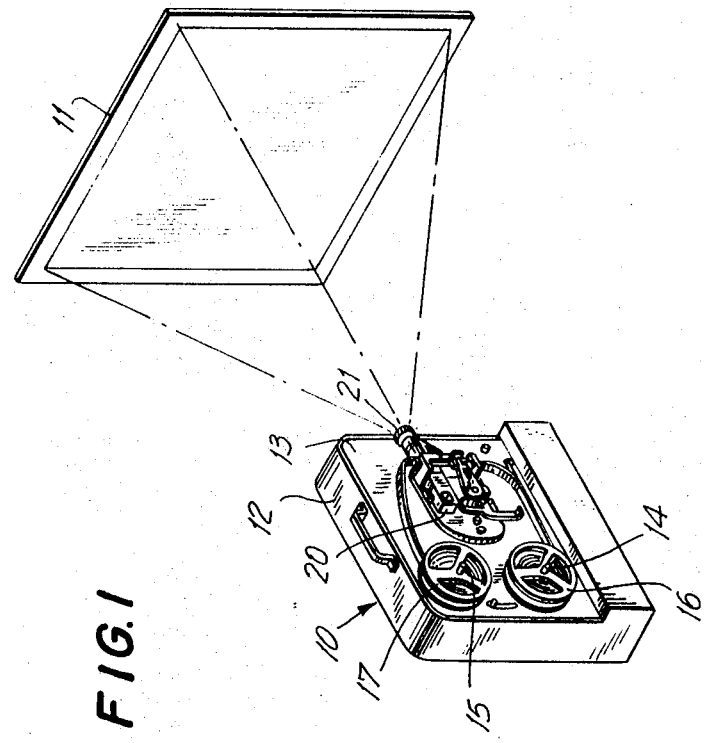
FIG. 1 is a top perspective view illustrating a motion picture film projector of the present invention in operative association with film and a screen.
Figure 3:
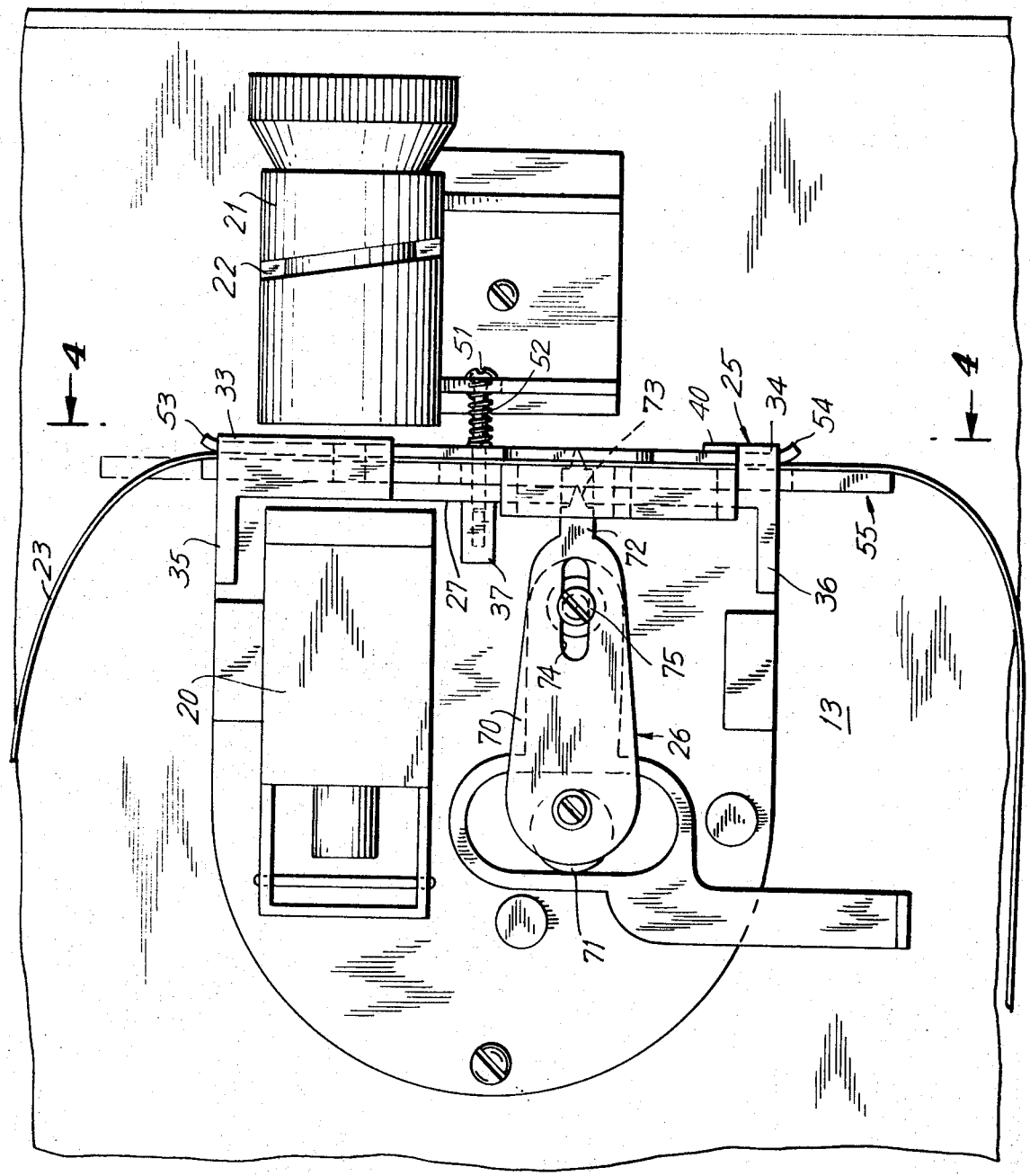
FIG. 3 is an enlarged side elevational view showing, in part, the projector of FIG. 1.

Referring now more particularly to the drawings, and specifically to FIG. 1 thereof, a motion picture film projector of the present invention is there generally designated 10, being shown as projecting onto a screen 11. The projector 10 may include a housing 12 defining a support structure on which may be mounted a pair of reel supports 14 and 15 for carrying film reels 16 and 17, respectively. An optical system includes a light source 20 and lens means 21 arranged to project light toward the screen 11. The light source 20 and lens holder 21 are best seen in FIG. 3, the latter being suitably mounted, as by a spiral or threaded connection 22, for adjustment or focusing.

Additionally, a length of film is designated 23, having its opposite ends coiled about respective reels 16 and 17, which reels rotate upon passage of the film through the optical system, as between the light source 20 and lens means 21. Thus, the film 23 passes transversely across the axis of the optical system 20, 21.

A film guide structure is generally designated 25, and receives the film 23 to constrain the latter to longitudinal movement transversely through or across the optical system 20, 21. In addition, a film advancing mechanism is generally designated 26, for engagement with the film 23 to effect stepwise movement of the film along its longitudinal path.

More specifically, the film guide structure may include a fixed member 27 fixedly secure by any suitable means to the mounting structure 13 having an elongate plate-like main portion 28 upstanding transversely through and across the axis of optical system 20, 21, being formed with a through aperture 29 aligned with the optical system for passing light therethrough. Also formed in the fixed plate 27, at longitudinally spaced apart locations below the light-passing aperture 29, are a pair of upper and lower receiver openings or holes 30 and 31, for a purpose appearing presently. The fixed member plate 27 may project laterally outwardly from the mounting structure 13, across and beyond the axis of optical system 20, 21, having its outer side cut away, or formed with a cutout, as at 32, between the lower and upper ends. The lower and upper ends of the fixed member 27 may extend forwardly, in a generally vertical plane, as by upper and lower forward extensions or retaining members 33 and 34. That is, the upper and lower retaining members 33 and 34 project forwardly from the fixed plate portion 28, while a pair of upper and lower generally horizontal members or flanges 35 and 36 project rearwardly. Additionally, a block or body 37 may project rearwardly from the vertical fixed plate member 28, adjacent to the mounting structures 13, as at 37. The block 37 may project forwardly beyond the fixed plate 28, to define a spacer, as at 38 in FIG. 5. Also projecting forwardly from the fixed generally vertical plate member 28, are a pair of vertically spaced and aligned tongues 39 and 40, for a purpose appearing presently.

A generally flat forward membr or pressure plate is generally designated 45, and is disposed in front of the fixed member 27, bearing against the forward end of spacer part 38 so as to be spaced forwardly of the fixed plate 28. The pressure member or plate 45 includes a laterally outstanding ear 46 located medially between the upper and lower ends, and is formed with a through hole 47 located in front of the spacer part 38, for a purpose appearing presently. In addition, the pressure member has an upper light transmitting aperture 48 in substantial alignment with the aperture 29 and the optical axis of the system 20, 21. At vertically spaced locations the pressure plate 45 is formed with vertically elongate slots 49 and 50, bing upper and lower respectively, and slidably receiving upper and lower tongue 39 and 40. The pressure plate 45 is thus effectively mounted in position, while being movable forwardly away from abutting engagement with the spacer 38. A threaded member or screw 51 extends spacedly through the pressure plate opening 47 into threaded engagement into the block 37, and may carry a coil compression spring or resilient element 52 circumposed about the fastener and resiliently, yieldably retaining the pressure plate 45 in position against the spacer part 38. The pressure plate 45 is resiliently yieldably displaceable forwardly, or rightwardly as seen in the drawings, against the force of spring 42. The upper and lower end regions of the pressure plate 45 may be bent forwardly, as at 53 and 54 in FIGS. 3 and 6, for a purpose appearing presently.

Figure 4:
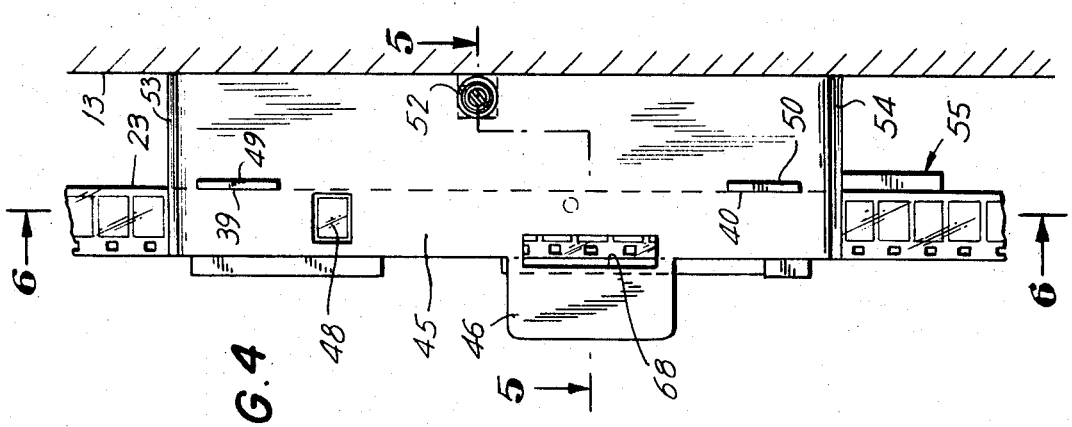
FIG. 4 is a partial sectional elevational view taken generally along the line 4—4 of FIG. 3.
Figure 2:
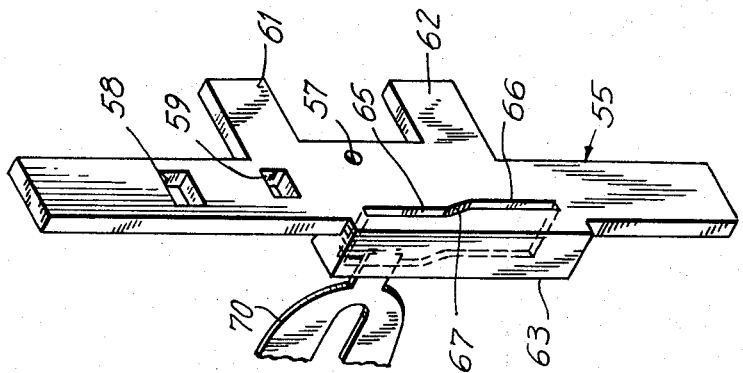
FIG. 2 is a fragmentary perspective view showing a shiftable film guide member and advancing member of the present invention, apart from the remainder thereof.

Interposed in sandwiched parallelism between said fixed member 27 and pressure member 45, is an elongate, generally flat, plate-lke shiftable member 55. As best seen in FIG. 2, 5 and 6, the shiftable member 55 includes an elongat vertically disposed, geerally flat main portion 56 having a rearwardly struck detent or projection 57 for slective engagement in one of the vertcally spaced receivers or holes 30 or 31 of the fixed member 27, see FIGS. 5 and 6. The detent or projection 57 is located vertically generally medially between the opposite upper and lower ends of the strip portions 56, and located in the upper region of the strip portion are a pair of vertically spaced through masking holes, perforations or apertures, an upper one being designated 58, and a lower one being designated 59. The masking apertures or perforations are sized and located laterally for properly masking respective films of standard 8 millimeter and Super 8. That is, the shiftable member 55 is shiftable between its lower solid line position, see FIG. 6, with the projection 57 engaged in receiver hole 31 and the upper masking aperture 58 aligned with the axis of optical system 20, 21, to an upper position shown in phantom in FIG. 6, wherein the projection 57 will engage in the upper receiver hole 30 and align the lower masking aperture 59 with the optical axis. The shiftable member 55 is movable between its selective vertically spaced positions by a slight forward movement to disengage the projection 57 from its receiving hole 30 or 31, and vertical shifting to align the projection with the other receiving hole. The slight forward shifting movement of the shiftable member is permitted by the resiliently yieldable holding actio of spring 52 against pressure plate 45 permitting the latter to be displaced slightly forwardly.

The shiftable member 55 further includes a pair of upper and lower, vertically spaced, laterally projecting spacer members or arms 61 and 62, see FIG. 2, which may slidably abut the mounting structure 13 to aid in maintaining the shiftable member in lateral position. Further, the shifting member may be provided with an enlarged rearwardly and outwardly projecting boss or block portion 63 which engages in the outer side cutout 32 of the fixed member 27 for vertically shifting movement with the shiftable member with the cutout. This may be seen in FIG. 5, where it will also appear that the shiftable member 55 engages, on its inner side, with the vertically spaced tongues 39 and 40. Further, the film 23 passes vertically in the space btween the pressure plate 45 and the forward side of the shiftable member 55, being laterally retained or held against lateral shifting movement on the inner side by the tongues 39 and 40, and on the outer side by the fixed member forward projections 33 and 34. Thus, the film 23 is constrained or guided for vertical movement, and held against lateral displacement.

As best seen in FIG. 2, the enlargement or boss 63 of shiftable member 55 is povided with a pair of generally vertically extending, laterally spaced slots 65 and 66, both of which open fowardly and rearwardly through the shiftable member and its enlarged portion. The slots 65 and 66 are not only spaced laterally apart with respect to each other, but are also spaced vertically, and are connected together by a connecting slot portion 67 which communicates between the adjacent ends of the slots 65 and 66. For purposes appearing more fully hereinafter, the upper slot 65 is located laterally and vertically with respect to the upper masking aperture 58 in accordance with the format of one type film, while the lower slot 66 and lower masking aperture 59 are located relative to each other in accordance with another film format. The forward member or pressure plate 45 is formed with a through opening or window 68 which is located in substantial alignment with a slot 65 or 66 when the siftable member 55 is shifted to locate a respective aperture 58 or 59 in alignment with the optical system 20, 21.

Additionally, the film advancing member or claw 26 may be defined by an elongate, stiff, resiliently flexible member 70 which may be of forwardly and rearwardly elongate configuration, say having its rearward end connected to a drive member 71, such as a rotary crank or eccentric to effect rotation of the rearward region of the advancing member, see FIG. 3. The forward end region 72 of the elongated advancing member 70 may be provided with an engaging element or point 73 extending slidably into a selected one of slots 65 or 66, to be guided thereby. An intermediate region of advancing member or arm 70 may be provided with a longitudinal slot 74 slidably receiving a constraining member or pin 75 fixed to the mounting structure 13. By this kinematic mechanism, the advancing member 26 has its free end portion movable both vertically or longitudinally of the film 22, and forwardly and rearwardly for engagement in and disengagement from a sprocket hole of the film, whereby the film is advanced stepwise through the guide means 25.

By the resilience of the advancing member or arm 70, or other adaptability thereof, upon vertical shifting movement of the shifting member 55, say upwardly from the position shown in FIGS. 2 and 3, the advancing member 26 is laterally displaceable, as during passage through the connecting or communicating slot portion 67, and into the laterally inwardly spaced slot 66. Simultaneously, the lower masking aperture 59 will be positioned in alignment with the optical system 20, 21. By the particular location and arrangement of each masked aperture 58 and 59 to its respective associated slot 65 and 66, the instant projector is adapted for use with motion picture film of a particular format.

It will therefore be appreciated that the device of the present invention provides a motion picture film projector which is extremely simple in construction for durability and reliability throughout along useful life, capable of quick and easy conversion for use in conjunction with different film formats, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A motion picture film projector for projecting different sizes of film, comprising a mounting structure, an optical system carried by said mounting structure, a film guide mounted by said mounting structure for receiving and guiding film along a path crossng said optical system, and a reciprocatory film advancing member engageable with sprocket holes of film for moving the latter along said path, said advancing member being latterally displaceable for egagement in sprocket holes of different size film, said guide having a plurality of laterally spaced elongate slots for selectively receiving said advancing member for advancing engagement thereof with a particular film sze, said elongate slots being spaced longitudinally of said path and connected by a connecting slot portion, and said guide being shiftably adjustable along said path to transfer said advancing member between said slots through said connecting slot portion.

2. A motion picture film projector according to claim 1, said guide having a plurality of different size masking perforations for selective alignment with said optical system to project different size film.

3. A motion picture film projector for projecting different sizes of film, comprising a mounting structure, an optical system carried by said mounting structure, a film guide mounted by said mounting structure for receiving and guiding film along a path crossing said optical system, and a reciprocatory film advancing member engageable with sprocket holes of film fo moving the latter along said path, said advancing member being laterally displaceable for engagement in sprocket holes of different size film, said guide having a plurality of laterally spaced elongate slots for selectively receiving said advancing member for advancing engagement threof with a particular film size, said guide having a plurality of different size masking perforations spaced longitudinally of said path for selectve alignment with said optical system to project different size film, said elongate slots being spaced longitudinally of said path and connected by a connecting slot portion, and said guide being shiftably adjustable along said path to transfer said advancing member between said slots through said connecting slot portion.

4. A motion picture film projector according to claim 3, said guide comprising a fixed member carried by said mounting structure and extending transversely of said optical system, and a shiftable member extending longitudinally of said fixed member and shiftable therealong transversely through said optical system, said laterally spaced slots being formed in said shiftable member and spaced longitudinally therealong, and said connecting slot portion merging smoothly with said laterally spaced slots, whereby said advancing member is laterally displaced btween said slots upon longitudinal shifting motion of said shifting member.

5. A motion picture film projector according to claim 4, said advancing member comprisng a thin resilient flexible arm having a sprocket hole engaging element and deflectable to afford said lateral displcement.

6. A motion picture film projector according to claim 4, said masking perforations being formed in said shiftable member at spaced locations longitudinally thereof.

7. A motion picture film projector according to claim 4, in combination with a pressure plate disposed in resilient bearing relation with said shiftable member to urge the latter toward said fixed member, and interfitting detent means on said fixed and shiftable members releasably retaining the latter in a selected position with respect to the former.

* * * * *